United States Patent
Zhang et al.

(10) Patent No.: US 12,418,213 B2
(45) Date of Patent: Sep. 16, 2025

(54) WATERPROOF MOTOR

(71) Applicant: Panasonic Motor (Hangzhou) Co., Ltd., Zhejiang (CN)

(72) Inventors: Lei Zhang, Zhejiang (CN); Wei Xiao, Zhejiang (CN)

(73) Assignee: Panasonic Motor (Hangzhou) Co., Ltd., Zhejiang (CN)

( * ) Notice: Subject to any disclaimer, the term of this patent is extended or adjusted under 35 U.S.C. 154(b) by 212 days.

(21) Appl. No.: 18/260,828

(22) PCT Filed: Feb. 7, 2021

(86) PCT No.: PCT/CN2021/075777
§ 371 (c)(1),
(2) Date: Jul. 10, 2023

(87) PCT Pub. No.: WO2022/147883
PCT Pub. Date: Jul. 14, 2022

(65) Prior Publication Data
US 2024/0072600 A1    Feb. 29, 2024

(30) Foreign Application Priority Data
Jan. 11, 2021    (CN) .......................... 202110029802.5

(51) Int. Cl.
*H02K 5/10* (2006.01)
*H02K 5/15* (2006.01)

(52) U.S. Cl.
CPC ................ *H02K 5/10* (2013.01); *H02K 5/15* (2013.01); *H02K 2211/03* (2013.01)

(58) Field of Classification Search
CPC ...... H02K 11/30; H02K 11/33; H02K 11/215; H02K 5/10; H02K 5/124; H02K 5/15; H02K 2211/03; Y02A 30/14
(Continued)

(56) References Cited

U.S. PATENT DOCUMENTS 9,755,473 B2    9/2017    Hsu et al.
2015/0069886 A1    3/2015    Hsu et al.
(Continued)

FOREIGN PATENT DOCUMENTS

CN    202586697 U    12/2012
CN    104467244 A    3/2015
(Continued)

OTHER PUBLICATIONS

Ge et al, Resisting Piece and Water Pump Motor of the Motor, Jun. 5, 2018, CN 207459872 (English Machine Translation) (Year: 2018).*

(Continued)

*Primary Examiner* — Alexander A Singh
(74) *Attorney, Agent, or Firm* — David D. Brush; Westman, Champlin & Koehler, P.A.

(57) ABSTRACT

A waterproof motor, which includes a stator arranged on a motor housing, a rotor arranged in the motor housing, a rotating shaft connected to the rotor and extending out of the motor housing, and a circuit board arranged in the motor housing. An inner end cap is arranged in the motor housing, between the rotor and the circuit board, which surround the rotating shaft and extends in the radial direction of the rotating shaft.

9 Claims, 6 Drawing Sheets

(58) Field of Classification Search
USPC .......................................... 310/89, 68 R, 90
See application file for complete search history.

(56) References Cited

U.S. PATENT DOCUMENTS

2019/0077440 A1\* 3/2019 Yamashita ............... B62D 5/07
2021/0029843 A1\* 1/2021 Ueno ................... H02K 5/1732

FOREIGN PATENT DOCUMENTS

| CN | 204290630 U | | 4/2015 |
|---|---|---|---|
| CN | 106208593 A | | 12/2016 |
| CN | 207459872 U | \* | 6/2018 |
| CN | 110971056 A | | 4/2020 |

OTHER PUBLICATIONS

International Search Report dated Sep. 28, 2021 for corresponding International Application No. PCT/CN2021/075777, filed Feb. 7, 2021.

Written Opinion of the International Searching Authority dated Sep. 28, 2021 for corresponding International Application No. PCT/CN2021/075777, filed Feb. 7, 2021.

English translation of the Written Opinion of the International Searching Authority dated Sep. 28, 2021 for corresponding International Application No. PCT/CN2021/075777, filed Feb. 7, 2021.

\* cited by examiner

WATERPROOF MOTOR

CROSS-REFERENCE TO RELATED APPLICATIONS

This Application is a Section 371 National Stage Application of International Application No. PCT/CN2021/075777, filed Feb. 7, 2021, which is incorporated by reference in its entirety and published as WO 2022/147883 on Jul. 14, 2022, not in English.

TECHNICAL FIELD

The present disclosure relates to the technical field of motors, in particular to a waterproof motor.

BACKGROUND ART

In different application scenarios, there are different requirements for the waterproof performance of motors. In the industry of electrical appliances, a standard for grading the electrical appliances according to their dust-proof and moisture-proof characteristics, called the IP protection level, has been promulgated The IP protection level is represented by two numbers, the first number indicates the level of the electrical appliance for preventing dust and preventing foreign object intrusion, and the second number indicates the airtightness degree of the electrical appliance for preventing moisture and preventing water immersion, and the larger the number, the higher the protection level. Different IP protection levels correspond to different waterproof performances. For example, IPX3-IPX6 levels correspond to resistance to a water drenching test, a splash test, a low-pressure water spray test, and a mass water spray test, respectively, while IPX 7 and IPX 8 levels correspond to resistance to water immersion and submersion tests, respectively.

To improve the waterproof performance of motors, common waterproofing methods for motors include at least covering the motor with a special housing or adding a waterproof shaft seal system to protect moving components of the motor. However, the special housing is more expensive, and the waterproof shaft seal system, such as adding waterproof rubber to the shaft extended part and applying sealant to the parts prone to water penetration, does not improve the waterproof performance significantly, and usually only improves the waterproof level of the motor to the IPX4 or IPX5 level, which can still lead to motor damage once the motor is immersed in water.

SUMMARY OF THE INVENTION

In response to the above-mentioned problems in the prior art, the present disclosure provides a waterproof motor, so that the motor can still keep running even if it is immersed in water, and the waterproof level of the motor is improved to the degree of preventing water immersion.

The inventor found through a lot of in-depth research that the main cause of damage to the motor after immersion in water is the damage caused by the case where water enters a circuit board, in order to solve the problem of damage to the motor caused by the case where after water enters the circuit board, the circuit board is burnt, the present disclosure provides a waterproof motor, which can solve the problem of burning of the circuit board after the motor is immersed in water. Specifically, the waterproof motor provided by the present disclosure includes a stator arranged on a motor housing, a rotor arranged in the motor housing, a rotating shaft connected to the rotor and extending out of the motor housing, and a circuit board arranged in the motor housing, where, in the motor housing, between the rotor and the circuit board, an inner end cap surrounding the rotating shaft and extending in the radial direction of the rotating shaft is further arranged.

Since the inner end cap is further arranged between the rotor and the circuit board, the inner end cap can form a chamber for sealing the circuit board together with the motor housing of the waterproof motor, and isolate the circuit board from the space where the rotor is located. In this way, even if the motor is immersed in water, the circuit board can be kept in the chamber independent of the immersion environment and is free of the case where due to water immersion, the circuit board is burnt. In addition, since the inner end cap surrounds the rotating shaft and extends in the radial direction of the rotating shaft, the inner end cap and the rotating shaft can be maintained relatively sealed while allowing relative rotation during the rotation of the rotating shaft. The test results show that the waterproof performance of the waterproof motor can be effectively improved by the above technical solutions, for example, the waterproof level of some waterproof motors using the above technical solutions can be improved to the IPX7 level.

In some exemplary technical solutions of the present disclosure, an edge portion of the inner end cap, which is far away from the rotating shaft, is closely fitted to the motor housing. Since the edge portion is closely fitted to the housing, a more effective waterproof sealing structure can be formed between the inner end cap and the motor housing to further guarantee the waterproof performance of the chamber where the circuit board is located.

In some exemplary technical solutions of the present disclosure, the inner end cap abuts against one end of the rotating shaft. According to the technical solution, the inner end cap can provide support for the rotating shaft by abutting against the rotating shaft, which improves the rotating stability of the rotating shaft.

In some exemplary technical embodiments of the present disclosure, a first surrounding portion surrounding the rotating shaft is arranged on the surface of one side of the inner end cap towards the rotor. According to the above technical solution, the first surrounding portion can increase the contact area between the inner end cap and the rotor. In some technical solutions, a bearing can also be added between the first surrounding portion and the rotor. In the technical solution, the first surrounding portion can also play a supporting and limiting role for the bearing, which improves the stability of the bearing.

In some exemplary technical solutions of the present disclosure, a second surrounding portion surrounding the first surrounding portion is arranged on the surface of one side of the inner end cap towards the rotor, and the second surrounding portion is closely fitted to the motor housing. The second surrounding portion can further increase the contact area between the inner end cap and the motor housing, which improves the sealing effect with the motor housing.

In some exemplary technical solutions of the present disclosure, the inner end cap is arranged in the form that the rotating shaft penetrates through the inner end cap. According to the technical solution, the length of the rotating shaft can be further extended, and the longer rotating shaft can facilitate stably supporting the inner end cap.

In some exemplary technical solutions of the present disclosure, the inner end cap further includes a sleeve portion, and the sleeve portion is formed by extending, along the rotating shaft, from one side of the inner end cap far away from the rotor. The sleeve portion extending along the rotating shaft can form a more stable support for the rotating shaft, and in addition, the inner end cap with the sleeve portion formed integrally can reduce the number of parts, which facilitates assembly.

In some exemplary technical solutions of the present disclosure, the waterproof motor further includes a seal ring arranged between the sleeve portion and the motor housing. The seal ring arranged between the sleeve portion and the motor housing can prevent water from flowing into the chamber where the circuit board is located through a gap between the sleeve portion and the motor housing, ensuring that the circuit board is isolated from water.

In some exemplary technical solutions of the present disclosure, the waterproof motor further includes a shaft sleeve, and the shaft sleeve sleeves the rotating shaft in the form of being closely adjacent to the inner end cap, and is arranged on one side of the circuit board.

In some exemplary technical solutions of the present disclosure, the waterproof motor further includes a shaft sleeve first seal ring, arranged between the shaft sleeve and the inner end cap. The shaft sleeve first seal ring can prevent water from flowing into the chamber where the circuit board is located through a gap between the shaft sleeve and the inner end cap, ensuring that the circuit board is isolated from water.

In some exemplary technical solutions of the present disclosure, the waterproof motor further includes a shaft sleeve second seal ring, arranged between the shaft sleeve and the motor housing. The shaft sleeve first seal ring can prevent water from flowing into the chamber where the circuit board is located through a gap between the shaft sleeve and the motor housing, ensuring that the circuit board is isolated from water.

In some exemplary technical solutions of the present disclosure, the circuit board is provided with Hall elements, and the inner end cap is made of a non-ferromagnetic material. The inner end cap made of the non-ferromagnetic material basically does not affect the magnetic field distribution around the rotor, so that the Hall element on the circuit board can accurately detect the magnetic field distribution around the rotor, and control the work of the waterproof motor according to the detected magnetic field distribution state.

DETAILED DESCRIPTION

The technical solutions in embodiments of the present disclosure will be clearly and completely described below with reference to the accompanying drawings in the embodiments of the present disclosure. Apparently, the described embodiments are merely some rather than all of the embodiments of the present disclosure. All other embodiments obtained by a person of ordinary skill in the art based on the embodiments in the present disclosure without creative efforts shall fall within the protection scope of the present disclosure.

In the description of the present application, it should be understood that, the orientation or positional relationships indicated by the terms "longitudinal," "transverse," "length," "width," "upper," "lower," "front," "rear," "left," "right," "vertical," "horizontal," "top," "bottom," "inner," "outer," etc. are based on the orientation or positional relationships shown in the drawings and are only for facilitating the description of the present application and simplifying the description, rather than indicating or implying that the apparatus or element referred to must have a particular orientation or be constructed and operated in a particular orientation, and therefore will not be interpreted as limiting the present application.

In addition, the terms "first" and "second" are used for descriptive purposes only and are not to be construed as indicating or implying relative importance or implicitly indicating the number of technical features indicated. Therefore, a feature restricted by "first" or "second" may explicitly indicate or implicitly include one or more such features. In the description of the present application, "a plurality of" means two or two or more, unless it is specifically defined otherwise.

In the present application, unless otherwise explicitly specified and defined, terms such as "mounted", "connected", "connection", and "fixed" should be understood in a broad sense. For example, the connection may be a fixed connection, a detachable connection, or an integral connection; the connection may be a mechanical connection or an electrical connection; the connection may be direct connection or indirect connection through an intermediate medium, and may be communication between the insides of two elements. A person of ordinary skill in the art may understand the specific meanings of the foregoing terms in the present application according to specific situations.

In the present application, unless otherwise explicitly specified and defined, a first feature is "above" or "below" a second feature may include that the first feature and the second feature are in direct contact, or the first feature and the second feature are not in direct contact, but in indirect contact through other features between them. In addition, that the first feature is "above", "over", or "on" the second feature may include that the first feature is directly above and obliquely above the second feature, or may merely indicate that the horizontal position of the first feature is higher than that of the second feature. That the first feature is "below", "under", and "beneath" the second feature may include that the first feature is directly below and obliquely below the second feature, or may merely indicate that the horizontal position of the first feature is lower than that of the second feature.

In addition, it should be noted that the term "extending in the radial direction" and similar terms should be understood in a broad sense and do not indicate a strict directional limitation in a mathematical sense. For example, the term "extending in the radial direction" only attempts to limit extending essentially in the radial direction.

Embodiment 1

As described in the background art, existing waterproofing measures make it difficult to effectively improve the waterproof performance of a waterproof motor 1. In particular, it is more difficult to make the waterproof level increase to the level of preventing water immersion through a simple apparatus structure. The inventor found through a lot of in-depth research that the main cause of damage to the motor after immersion in water is the damage caused by the case where water enters a circuit board 6, in order to solve the problem of damage to the motor caused by the case where after water enters the circuit board 6, the circuit board is burnt, this embodiment provides a waterproof motor 1, which can solve the problem of burning of the circuit board 6 after the motor is immersed in water.

Figure 1:
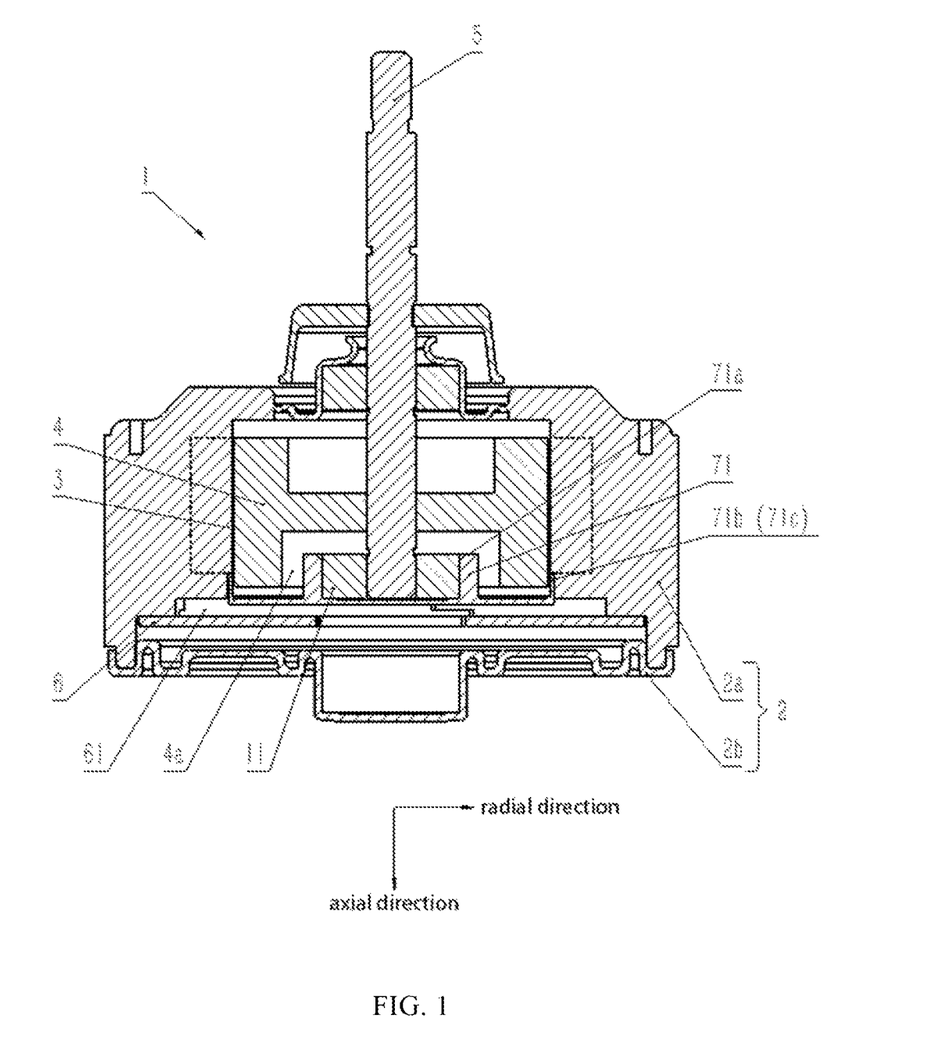
FIG. 1 is a sectional view of a waterproof motor in Embodiment 1 of the present disclosure.

Specifically, with reference to FIG. 1, this embodiment provides a waterproof motor 1, including a stator 3 arranged on a motor housing 2, a rotor 4 arranged in the motor housing 2, a rotating shaft 5 connected to the rotor 4 and extending out of the motor housing 2, and the circuit board 6 arranged in the motor housing 2, where in the motor housing 2, particularly between the rotor 4 and the circuit board 6, an inner end cap 71 is arranged. The inner end cap 71 surrounds the rotating shaft 5 and extends in the radial direction of the rotating shaft 5.

Because of the presence of the inner end cap 71, the inner end cap can form a chamber 61 for sealing the circuit board 6 together with the motor housing 2 of the waterproof motor 1. The chamber 61 is isolated from the space where the rotor 4 is located, and even if the motor is immersed in water, for example, if water enters the space where the rotor 4 is located, the circuit board 6 is still kept in the chamber 61 independent of the space where the rotor 4 is located and is free of the case where due to water immersion, the circuit board is burnt.

In addition, since the inner end cap 71 surrounds the rotating shaft 5 and extends in the radial direction of the rotating shaft 5, the inner end cap 71 and the rotating shaft 5 can be maintained relatively sealed while allowing relative rotation during the rotation of the rotating shaft 5. The test results show that the waterproof performance of the waterproof motor 1 provided in this embodiment can be effectively improved, for example, the waterproof performance can be improved to the IPX7 level.

The motor housing 2 includes at least a plastic seal member 2b and an outer end cap 2a arranged at the end of the plastic seal member 2b. The plastic seal member 2b is of an overall barrel structure, with the central hollow space partially used to accommodate the rotor 4 and partially used to accommodate the circuit board 6. The outer end cap 2a and the circuit board 6 are arranged on the same side of the rotor 4.

In the prior art, the space where the rotor 4 is located and the space where the circuit board 6 is located are interconnected, once the rotor 4 is immersed in water, the circuit board 6 will also be exposed to moisture and burnt. In this embodiment, a chamber 61 with a high waterproof performance for containing the circuit board 6 is defined by the outer end cap 2a, the plastic seal member 2b and the inner end cap 71 together, and the chamber 61 is independent of the space of the rotor 4. The above can effectively improve the waterproof performance of the waterproof motor 1 by simply adding the simple inner end cap 71, which can bring the benefit of a higher waterproof performance at a smaller cost increase.

In this exemplary embodiment, the inner end cap 71 has an edge portion 71c far away from the rotating shaft 5, and the edge portion 71c is closely fitted to the motor housing 2. Specifically, the edge portion 71c is the outermost edge part of the inner end cap 71 in the radial direction, which abuts against the plastic seal member 2b of the motor housing 2 and is closely fitted to the plastic seal member 2b to the extent that the close fitting is sufficient to prevent water with the pressure of water immersion from entering the other side from one side, thereby ensuring the waterproof performance of the chamber 61. In the above way, a more effective waterproof sealing structure can be formed between the inner end cap 71 and the motor housing 2, and the independent chamber 61 with a higher waterproof performance is further provided inside the waterproof motor 1 for the circuit board 6 and other components related to the core of the waterproof performance, thus improving the overall waterproof performance of the waterproof motor 1.

In this embodiment, the center of the inner end cap 71 is of a non-porous structure. Specifically, the bottom of the integrally formed inner end cap 71 (lower side surface in FIG. 1) is formed as a complete flat surface, and the center of the inner end cap 71 and the lower end of the rotating shaft 5 abut against each other, thereby forming an axial support for the rotating shaft 5 and improving the rotating stability of the rotating shaft 5.

Figure 2:
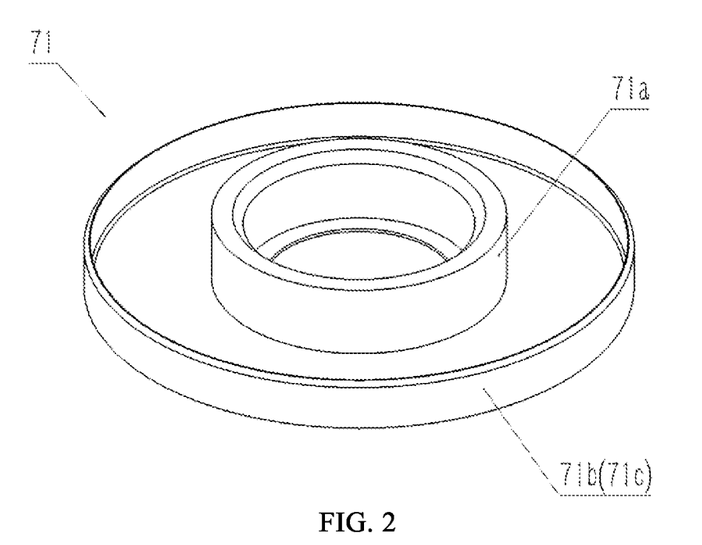
FIG. 2 is a structural schematic view of a front end cap in the embodiment of FIG. 1.

With reference to FIG. 1 and FIG. 2, as a exemplary embodiment, the inner end cap 71 in this embodiment is provided with, on the surface of one side towards the rotor 4, a first surrounding portion 71a surrounding the rotating shaft 5. The first surrounding portion 71a can surround the rotating shaft 5 in a way of being fitted to each other, or can surround the rotating shaft 5 in a way of being spaced apart from each other, as long as the first surrounding portion can prevent the water at the location of the rotating shaft 5 from flowing into the chamber 61 of the circuit board 6.

In this embodiment, the rotor 4 has a recessed portion 4a at the bottom center, the first surrounding portion 71a and the inner wall of the recessed portion 4a are closely fitted to the extent that the close fitting is sufficient to prevent water with the pressure of water immersion (IPX7 waterproof level) from entering the other side from one side. Since the first surrounding portion 71a extends in the axial direction, the first surrounding portion has a large contact area with the inner wall of the recessed portion 4a, thereby effectively improving the waterproof performance.

In addition, since in this embodiment, the first surrounding portion 71a is fitted to the inner wall of the recessed portion 4a instead of directly fitted to the rotating shaft 5, there is a space for mounting a bearing 11 between the first surrounding portion 71a and the rotating shaft 5. The surfaces on both sides of the first surrounding portion 71a are closely fitted to the inner wall of the recessed portion 4a, and the outer wall of the bearing 11, respectively, which on the one hand can increase the contact area with both sides and improve the waterproof performance, and on the other hand can provide support for the bearing 11 and limit the position of the bearing 11 in the axial and radial directions to improve the stability of the bearing 11.

The inner end cap 71 also has a second surrounding portion 71b on the outside of the first surrounding portion 71a. The second surrounding portion 71b is also located on the surface of one side of the inner end cap 71 toward the rotor 4 and surrounds the first surrounding portion 71a. Both sides of the second surrounding portion 71b are closely fitted to the outer edge of the rotor 4 and the inner edge of the plastic seal member 2b, respectively, thus completing a waterproof seal between the plastic seal member 2b and the outer edge of the rotor 4. Since the second surrounding portion 71b also extends in the axial direction, similar to the first surrounding portion 71a, the structure can increase the contact area with components (the plastic seal member 2b and the rotor 4) on both sides and improve the waterproof performance.

In this embodiment, both the first surrounding portion 71a and the second surrounding portion 71b are ring-shaped. In other embodiments of the present disclosure, the shapes of the first surrounding portion 71a and the second surrounding portion 71b can also be adjusted as needed and are not limited to a ring shape.

In the above way, the waterproof motor 1 provided in this embodiment provides the chamber 61 separated from the rotor 4 for the circuit board 6 by arranging the inner end cap 71 between the circuit board 6 and the rotor 4, and even if the motor is immersed in water, the circuit board 6 can still be kept in the chamber 61 independent of the immersion environment and will be free of the case where due to motor immersion, the circuit board is burnt. In addition, since the inner end cap 71 surrounds the rotating shaft 5 and extends in the radial direction of the rotating shaft 5, the inner end cap 71 and the rotating shaft 5 can be maintained relatively sealed while allowing relative rotation during the rotation of the rotating shaft 5. The test results show that the waterproof performance of the waterproof motor 1 can be effectively improved by using the above technical solutions, for example, the level of preventing water immersion can be achieved.

Embodiment 2

Figure 3:
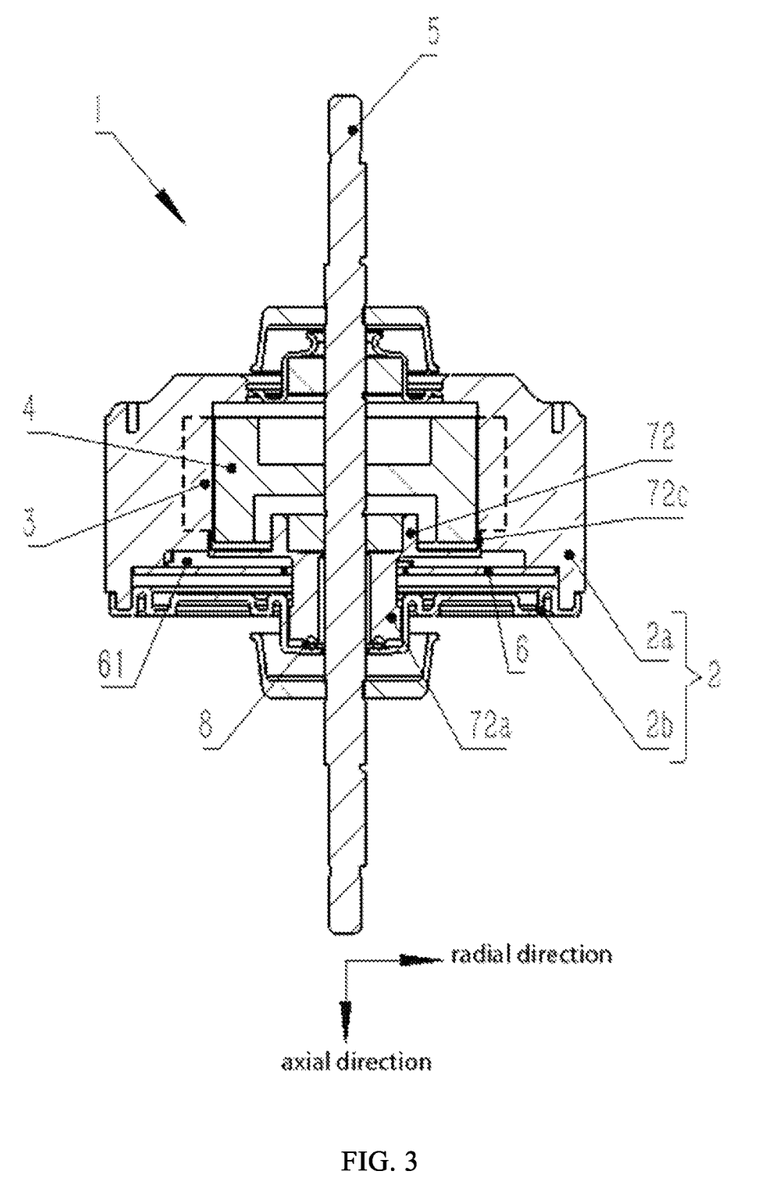
FIG. 3 is a sectional view of a waterproof motor in Embodiment 2 of the present disclosure.

FIG. 3 is a sectional view of a waterproof motor 1 in Embodiment 2 of the present disclosure.

In this embodiment, the main structure of the waterproof motor 1 has a motor housing 2, a stator 3, a rotor 4, a rotating shaft 5, a circuit board 6, and a front end cap 72. In this embodiment, merely, the structure of the front end cap 72 differs from that of the front end cap 71 in Embodiment 1 to some extent, and the rotating shaft 5 extends out of the motor housing 2 from both sides, the other components and the numeral references in the accompanying drawing are the same as those shown in FIG. 1 of Embodiment 1, and will not be repeated here.

As shown in FIG. 3, the inner end cap 72 in this embodiment is provided with a through hole penetrating through the inner end cap 72 in the axial direction, and the rotating shaft 5 comes in from one side of the inner end cap 72 and comes out from the other side of the inner end cap in a penetrating mode, thereby penetrating through the inner end cap 72. Further, the rotating shaft 5 also comes out from the upper and lower sides of the motor housing 2 in a penetrating mode, respectively, and the upper and lower sides of the rotating shaft 5 can also be provided with blades, respectively, so as to form a fan structure suitable for, for example, a duct type indoor unit. Accordingly, the waterproof motor 1 extending out of a single side of the motor housing 2 can be applied to the fan structure of a wall-mounted air conditioner. Of course, the above structure provided with the blades is only an illustration by way of example, and the waterproof motor 1 provided in this embodiment can also be used in any other suitable application scenarios.

Figure 4:
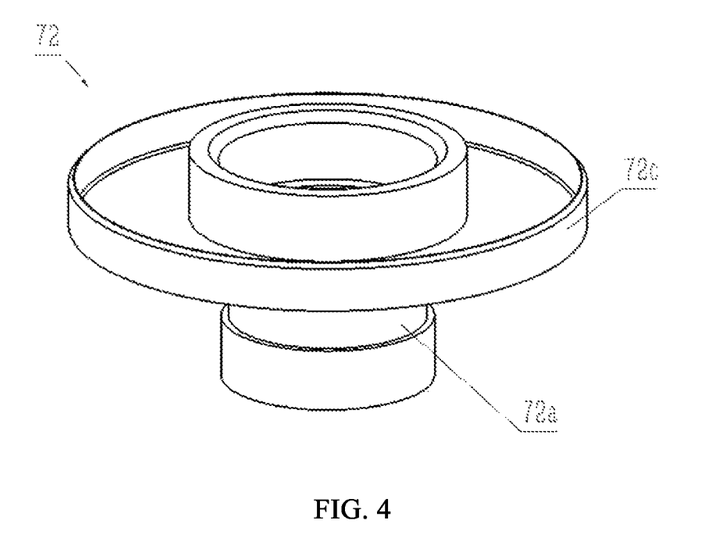
FIG. 4 is a structural schematic view of a front end cap in the embodiment of FIG. 3.

With reference to FIG. 3 and FIG. 4, the inner end cap 72 is further integrally formed with a sleeve portion 72a, and the sleeve portion 72a extends from one side of the inner end cap 72 far away from the rotor 4, in the axial direction of the rotating shaft 5. Specifically, the sleeve portion 72a is ring-shaped, and the inner wall thereof is slidably connected to the rotating shaft 5, which can support the rotating shaft 5 and suppress the wobble of the rotating shaft 5 in the radial direction.

In the above way, the length of the rotating shaft 5 is extended, and by installing a bearing or the sleeve portion 72a in the extended part, the span of the supporting components such as the bearing or the sleeve portion 72a in the axial direction can be increased, improving the supporting stability of the rotating shaft 5. Since the inner end cap 72 is an integrally formed structure, the number of parts during assembly is small, making assembly more convenient. Moreover, as long as the manufacturing accuracy of the inner end cap 72 can be guaranteed, an edge portion 72c of the inner end cap 72 can also be closely fitted to the motor housing 2 for sealing as long as the sleeve portion 72a surrounds and sleeves the rotating shaft 5 to be closely fitted with the rotating shaft 5 during assembly.

To further improve the sealing performance of the chamber 61, the waterproof motor 1 of this embodiment is further provided with a seal ring 8 between the sleeve portion 72a and an outer end cap 2a of the motor housing 2. The seal ring 8 can prevent water from flowing into the sealed chamber 61 where the circuit board 6 is located through a gap between the sleeve portion 72a and the outer end cap 2a, ensuring that the circuit board 6 is isolated from water.

It should be noted that although the waterproof motor 1 provided in this embodiment is a two-axis motor, that is, the rotating shaft 5 of the waterproof motor 1 extends out of both sides of the waterproof motor 1, but a person of ordinary skill in the art can understand that this embodiment is only an exemplary description, in other embodiments, the rotating shaft 5 of the waterproof motor 1 can also extends out of a single side of the waterproof motor 1, thus constituting a single-axis motor, and other components or structures only need to be adaptively adjusted. Without departing from the main idea of the present disclosure, the above technical solutions obtained from the adaptive adjustment do not exceed the scope of protection of the present disclosure.

Embodiment 3

Figure 5:
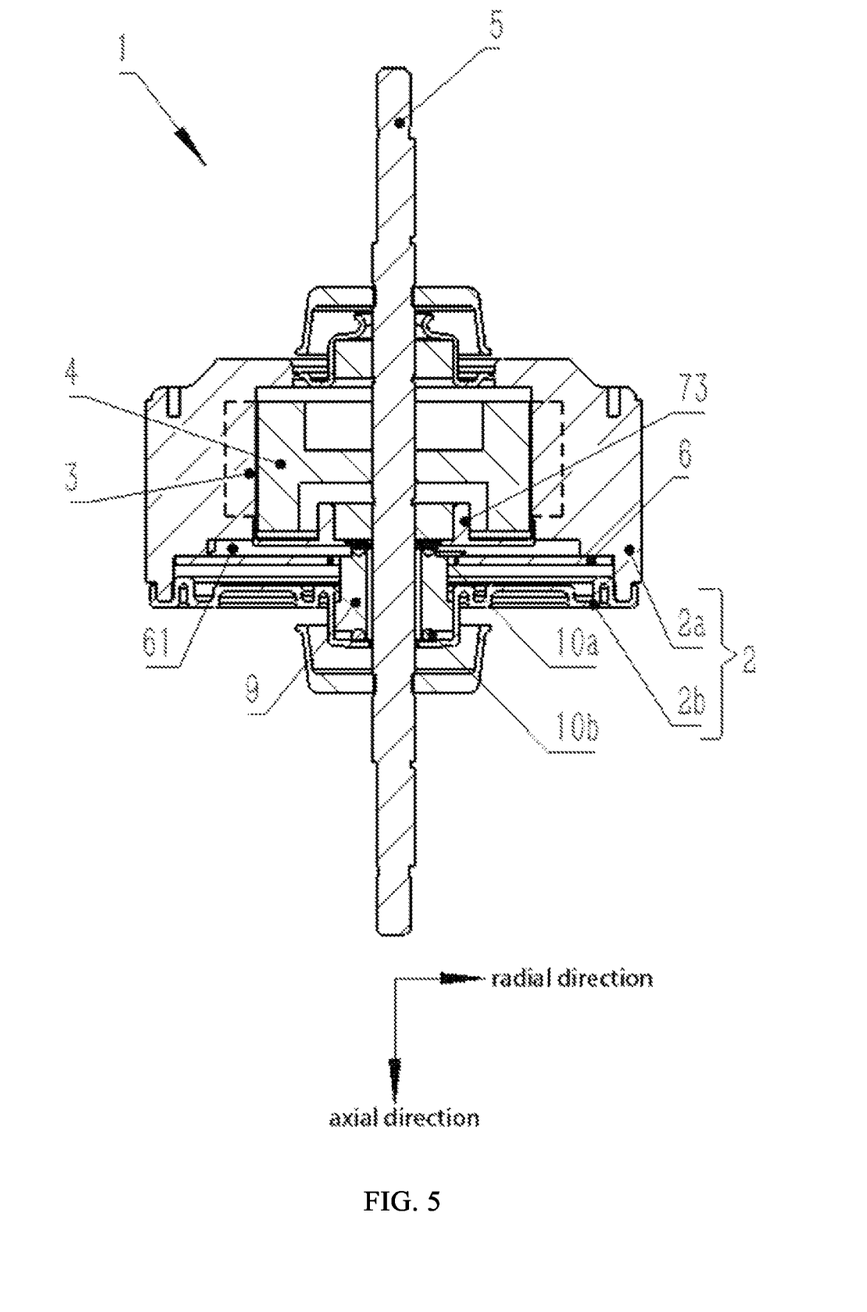
FIG. 5 is a sectional view of a waterproof motor in Embodiment 3 of the present disclosure.

FIG. 5 is a sectional view of a waterproof motor 1 in Embodiment 3 of the present disclosure.

As shown in FIG. 5, compared with Embodiment 1, in the main structure of the waterproof motor 1, except that a shaft sleeve 9 is further arranged in this Embodiment, and the other components in this embodiment and reference numerals in the accompanying drawing are the same as those shown in FIG. 1 of Embodiment 1, and will not be repeated here.

Specifically, the shaft sleeve 9 is arranged on the side of the inner end cap 73 close to the circuit board 6, and the shaft sleeve 9 is arranged closely adjacent to the inner end cap 73. The shaft sleeve 9 extends in the axial direction of the rotating shaft 5 and is formed into a ring shape, and the inner wall of the ring-shaped shaft sleeve 9 is slidably connected to the rotating shaft 5, and the rotating shaft 5 can rotate inside the shaft sleeve 9 and can be supported by the shaft sleeve 9. Similar to the sleeve portion 72a in Embodiment 2, the shaft sleeve 9 provides a more stable support for the rotating shaft 5. The circuit board 6 is also configured as an annular structure.

Figure 6:
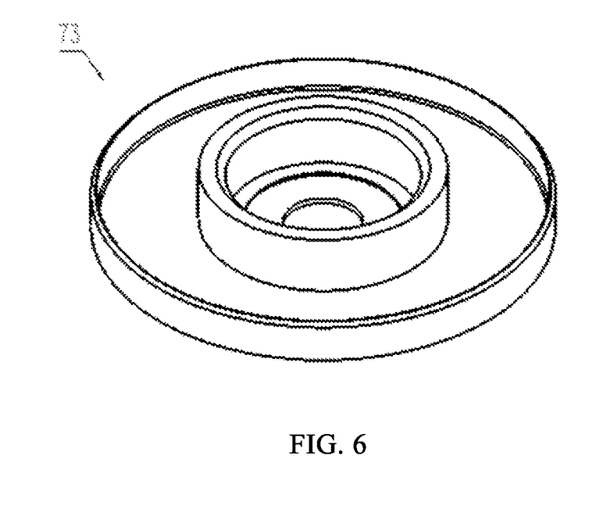
FIG. 6 is a structural schematic view of a front end cap in the embodiment of FIG. 5.

With reference to FIG. 5 and FIG. 6, in this embodiment, both the front end cap 73 and the shaft sleeve 9 are provided with a through hole in the center. The rotating shaft 5 passes through the center of the shaft sleeve 9, and the shaft sleeve 9 passes through the center of the circuit board 6, and the rotating shaft, the shaft sleeve and the circuit board are sequentially connected in a sleeving mode from the center to the periphery to ensure the overall counterweight balance of the motor.

In addition, in order to further guarantee the waterproof performance of a chamber 61, a shaft sleeve first seal ring 10*a* is arranged between the shaft sleeve 9 and the inner end cap 73. Between the shaft sleeve 9 and a motor housing 2 (specifically between the shaft sleeve 9 and an outer end cap 2*a*), a shaft sleeve second seal ring 10*b* is further arranged. The shaft sleeve first seal ring 10*a* can prevent water from flowing into the chamber 61 where the circuit board 6 is located through a gap between the shaft sleeve 9 and the inner end cap 73, and the shaft sleeve second seal ring 10*b* can prevent water from flowing into the chamber 61 where the circuit board 6 is located through a gap between the shaft sleeve 9 and the outer end cap 2*a*, thus blocking the gaps at the upper and lower ends of the shaft sleeve 9, respectively, to ensure that the circuit board 6 is isolated from water.

Similarly to Embodiment 2, in this embodiment, the front end cover 73 is provided with the through hole in the center, and the rotating shaft 5 passes through the front end cover 73 and extends to come out from both sides of the motor housing 2 in a penetrating mode, respectively. Of course, in some other embodiments, the rotating shaft 5 may also come out from a single side of the motor housing 2.

In the above embodiments 1-3, the circuit board 6 may be provided with Hall elements (not shown) for detecting the magnetic field distribution of the rotor 4 and controlling the operation of the waterproof motor 1 based on the detection results. Since the inner end caps 71, 72 and 73 are arranged between the rotor 4 and the circuit board 6 in the embodiments of the present disclosure, in order to avoid interference by the inner end caps 71, 72 and 73 to the electromagnetic field generated by the rotor 4, in the above Embodiments 1-3, the inner end caps 71, 72 and 73 can be all made of a non-ferromagnetic material, specifically, the material of the inner end caps 71, 72 and 73 can be a metal material with a relatively high strength, such as copper, aluminum, stainless steel and other non-magnetic metal materials, or a rubber material. Selecting and using the metal material to manufacture the inner end covers 71, 72 and 73 can improve the support for the rotating shaft 5, while selecting and using the rubber material to manufacture the inner end covers 71, 72 and 73 can further improve the waterproof performance of the waterproof motor 1. A person skilled in the art can flexibly select the two materials mentioned above as well as other suitable materials as needed.

The above description is only exemplary embodiments of the present disclosure and not intended to limit the present disclosure. Any modification, equivalent replacement, or improvement made within the spirit and principle of the present disclosure shall fall within the protection scope of the present disclosure.

LIST OF REFERENCE NUMERALS

1: waterproof motor
2: motor housing
2*a*: outer end cap
2*b*: plastic seal member
3: stator
4: rotor
4*a*: recessed portion
5: rotating shaft
6: circuit board
61: chamber
71, 72, 73: inner end cap
71*a*: first surrounding portion
71*b*: second surrounding portion
71*c*: edge portion
72*a*: sleeve portion
72*c*: edge portion
8: seal ring
9: shaft sleeve
10*a*: shaft sleeve first seal ring
10*b*: shaft sleeve second seal ring
11: bearing

The invention claimed is:

1. A waterproof motor, comprising:
    a motor housing;
    a stator, arranged on the motor housing;
    a rotor, arranged in the motor housing;
    a rotatable shaft, connected to the rotor and extending out of the motor housing;
    a circuit board, arranged in the motor housing;
    an inner end cap arranged in the motor housing, between the rotor and the circuit board, the inner end cap surrounding the rotatable shaft and extending in a radial direction of the rotatable shaft, wherein the rotatable shaft penetrates through the inner end cap; and
    a shaft sleeve, the shaft sleeve sleeving the rotatable shaft and being closely adjacent to the inner end cap and arranged on one side of the circuit board.

2. The waterproof motor according to claim 1, wherein an edge portion of the inner end cap, which is positioned away from the rotating shaft, is closely fitted to the motor housing.

3. The waterproof motor according to claim 1, wherein the inner end cap abuts against one end of the rotatable shaft.

4. The waterproof motor according to claim 3, wherein a first surrounding portion surrounding the rotatable shaft is arranged on a surface of one side of the inner end cap towards the rotor.

5. The waterproof motor according to claim 4, wherein a second surrounding portion surrounding the first surrounding portion is arranged on the surface of one side of the inner end cap towards the rotor, and the second surrounding portion is closely fitted to the motor housing.

6. The waterproof motor according to claim 1, wherein the inner end cap further comprises a sleeve portion, and the sleeve portion is formed by extending, along the rotatable shaft, from one side of the inner end cap positioned away from the rotor.

7. The waterproof motor according to claim 6, further comprising:
    a seal ring arranged between the sleeve portion and the motor housing.

8. The waterproof motor according to claim 1, further comprising:
    a shaft sleeve first seal ring, arranged between the shaft sleeve and the inner end cap.

9. The waterproof motor according to claim 1, further comprising:
    a shaft sleeve second seal ring, arranged between the shaft sleeve and the motor housing.

* * * * *